(12) United States Patent
Elliott et al.

(10) Patent No.: US 10,123,170 B2
(45) Date of Patent: Nov. 6, 2018

(54) ENERGY STORAGE MANAGEMENT IN SOLAR-POWERED TRACKING DEVICES

(71) Applicant: Verizon Patent and Licensing Inc., Arlington, VA (US)

(72) Inventors: Bryant Elliott, Marietta, GA (US); Benjamin J. Hamby, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/151,788

(22) Filed: May 11, 2016

(65) Prior Publication Data

US 2017/0332199 A1 Nov. 16, 2017

(51) Int. Cl.
*H04W 4/02* (2018.01)
*H04W 52/02* (2009.01)
*G06Q 10/08* (2012.01)

(52) U.S. Cl.
CPC ....... *H04W 4/023* (2013.01); *H04W 52/0229* (2013.01); *H04W 52/0248* (2013.01); *H04W 52/0296* (2013.01); *G06Q 10/0833* (2013.01); *Y02D 70/00* (2018.01); *Y04S 10/56* (2013.01)

(58) Field of Classification Search
CPC ...... G01S 5/0027; B60R 25/102; G06Q 10/08
See application file for complete search history.

(56) References Cited

U.S. PATENT DOCUMENTS

| 5,666,658 | A | * | 9/1997 | Borchardt | ............ | H04B 1/0096 |
| | | | | | | 348/E5.093 |
| 6,339,397 | B1 | * | 1/2002 | Baker | ................... | B61L 25/021 |
| | | | | | | 342/357.64 |
| 7,199,488 | B1 | | 4/2007 | Baker | | |
| 8,494,478 | B1 | * | 7/2013 | Ponnangath | ........ | G06F 11/1456 |
| | | | | | | 455/343.1 |
| 9,182,238 | B2 | * | 11/2015 | Lau | .......................... | G01S 19/34 |
| 9,426,730 | B2 | * | 8/2016 | Chambers | | |
| 2011/0036344 | A1 | * | 2/2011 | Jain | ......................... | H02S 50/10 |
| | | | | | | 126/575 |
| 2012/0201277 | A1 | * | 8/2012 | Tanner | ................... | G06Q 10/08 |
| | | | | | | 375/141 |

(Continued)

OTHER PUBLICATIONS

Wikipedia, "GPS tracking unit," https://en.wikipedia.org/wiki/GPS_tracking_unit, Apr. 4, 2016, 8 pages.

(Continued)

*Primary Examiner* — Kathy Wang-Hurst
*Assistant Examiner* — Ernest Tacsik

(57) ABSTRACT

A device may detect occurrence of an event. The device may receive energy storage information and solar charging information. The energy storage information may be associated with an energy storage component. The solar charging information may be associated with a solar array. The energy storage information and the solar charging information may be received based on the occurrence of the event. The device may set, based on at least one of the energy storage information or the solar charging information, a time value and/or a radio operation state. The device may determine, based on the time value, to determine location information. The device may determine location information. The device may transmit the location information based on the radio operation state.

20 Claims, 7 Drawing Sheets

(56) References Cited

U.S. PATENT DOCUMENTS

2012/0243214 A1* 9/2012 Richmond ............. F21S 9/035
362/183
2013/0326642 A1* 12/2013 Hajj ........................ G06F 21/88
726/34
2018/0014253 A1* 1/2018 Dai Javad ......... H04W 52/0277

OTHER PUBLICATIONS

Wikipedia, "RailRider," https://en.wikipedia.org/wiki/RailRider, Jan. 17, 2016, 2 pages.

* cited by examiner

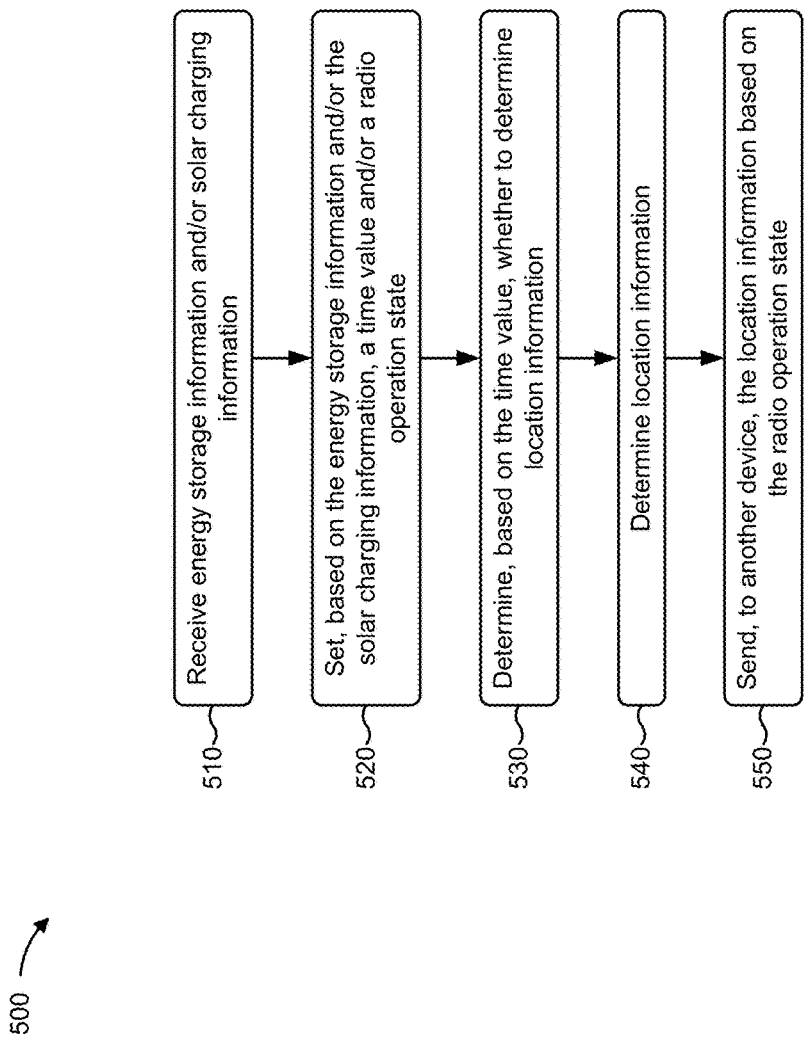

ENERGY STORAGE MANAGEMENT IN SOLAR-POWERED TRACKING DEVICES

BACKGROUND

Tracking devices may be attached to movable assets (e.g., vehicles (e.g., buses, trucks, trailers, tractors, or the like), machines, shipping containers, and/or other types of movable physical assets). A tracking device may use a satellite navigation system (e.g., a global navigation satellite system (GNSS), such as the Global Positioning System (GPS) operated by the United States) to periodically determine location information (e.g., a latitude, a longitude, an altitude, etc.) for the asset to which the tracking device is attached. A tracking device may periodically report the location information via wireless communication (e.g., via a cellular network, wireless communication with another device, or the like).

BRIEF DESCRIPTION OF THE DRAWINGS

FIG. 5 is a flow chart of an example process for energy storage management in solar-powered tracking devices.

DETAILED DESCRIPTION OF PREFERRED EMBODIMENTS

The following detailed description of example implementations refers to the accompanying drawings. The same reference numbers in different drawings may identify the same or similar elements.

Tracking devices that rely on internal power sources (e.g., an energy storage component (e.g., a battery) and/or a solar panel) may have operational limitations due to limitations of the power source. Tracking devices powered by stored energy may limit the frequency with which location information may be obtained to conserve stored energy. Solar-powered tracking devices may have sufficient power during daylight, but may need to shut down and/or rely on battery power at times (e.g., at night) when insufficient solar energy is available. Implementations described herein may enable dynamic energy storage management (e.g., dynamic battery management or the like), in solar-powered tracking devices, based on energy storage information and/or solar charging information.

Figure 1A:
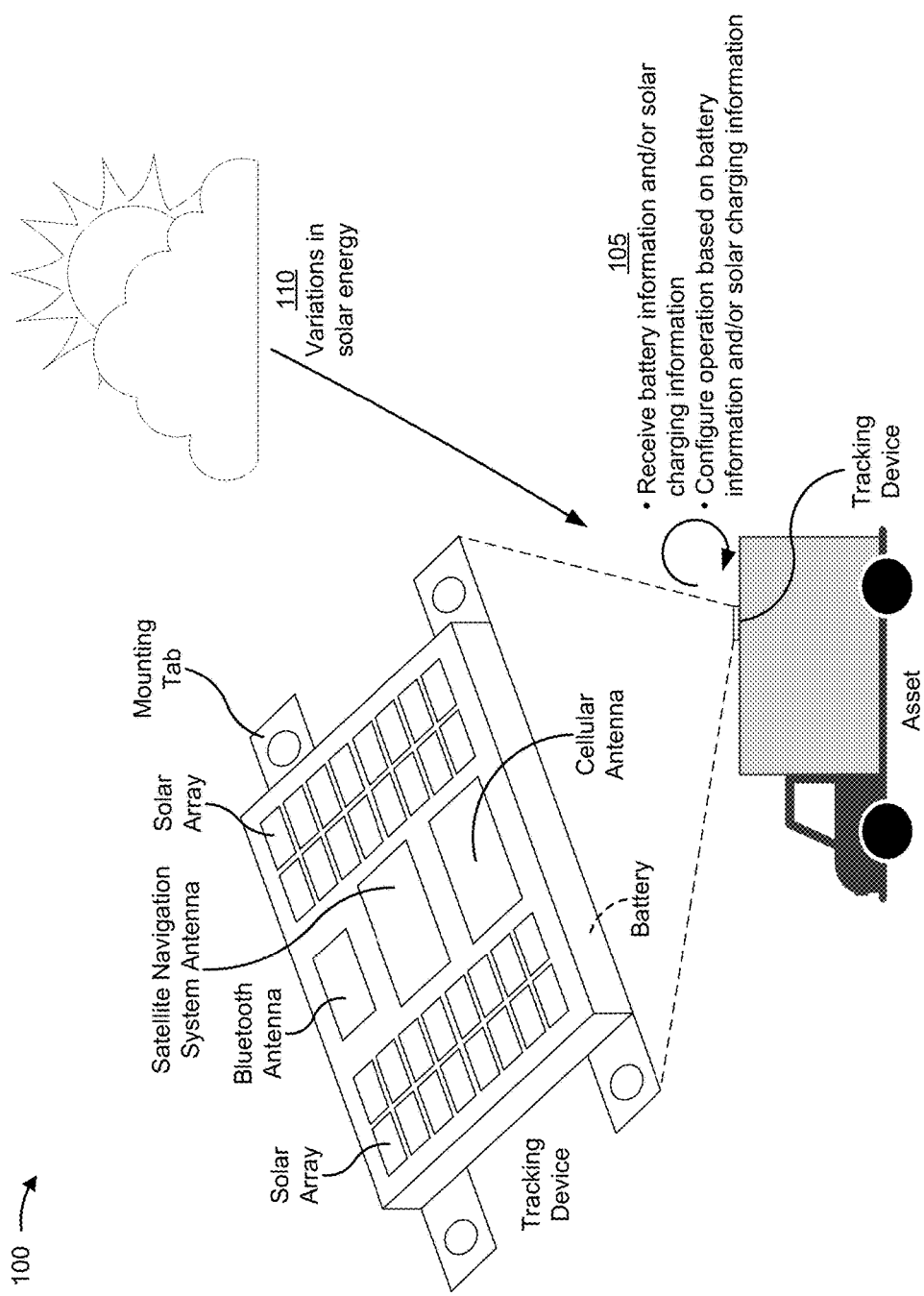
FIGS. 1A-1C are diagrams of an overview of an example implementation described herein.
Figure 1B:
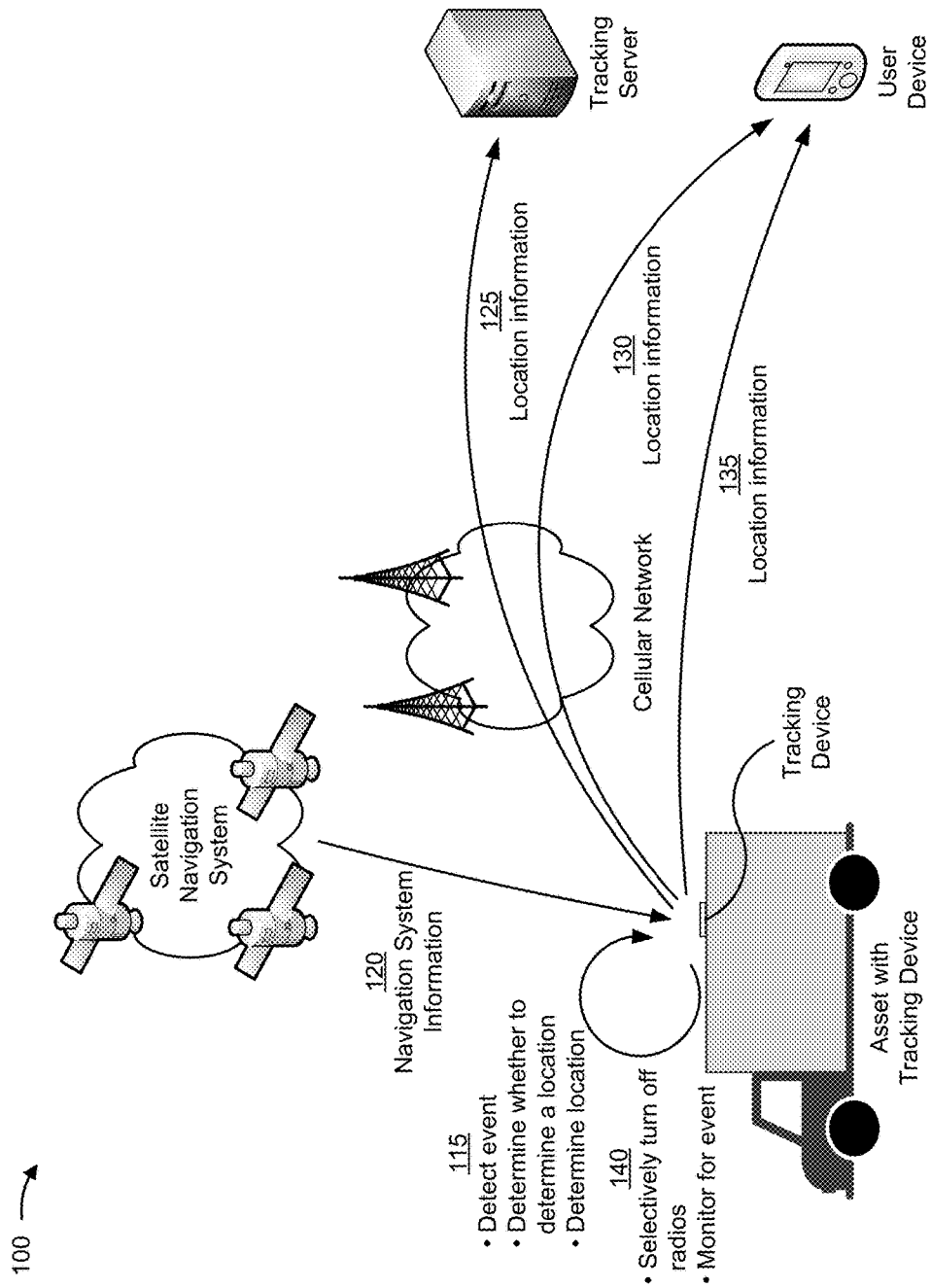
Figure 1C:
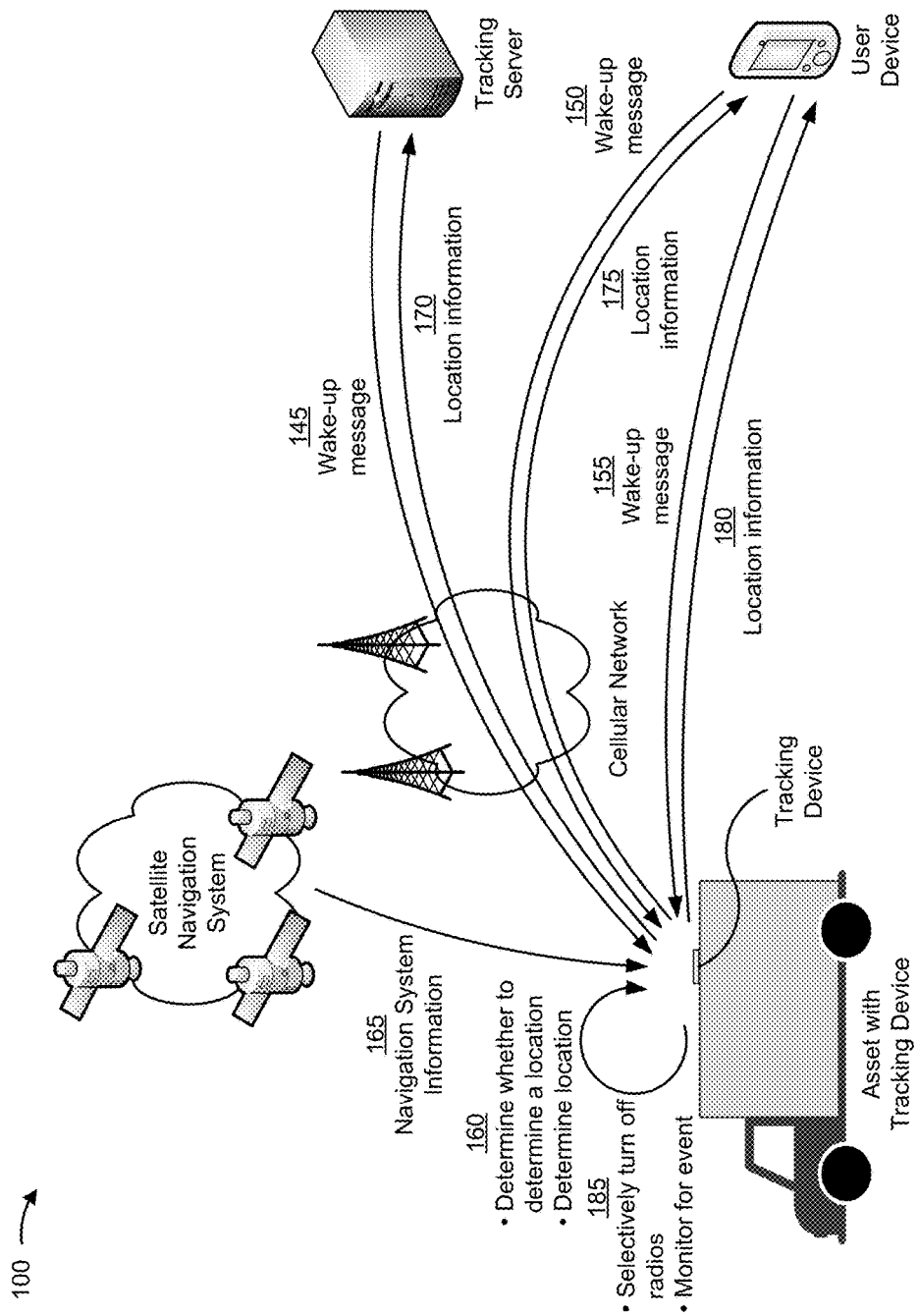

FIGS. 1A-1C are diagrams of an overview of an example implementation 100 described herein. As shown in FIG. 1A, a tracking device may, in some implementations, include at least one solar array, a short-range radio (e.g., BLUETOOTH) antenna, a satellite navigation system antenna, a cellular radio antenna, mounting tabs, and a battery.

As further shown in FIG. 1A, the tracking device may be mounted (e.g., using the mounting tabs) to an asset (e.g., a vehicle (e.g., a bus, a truck, a trailer, a tractor, or the like), a machine, a shipping container, and/or another type of movable asset) for tracking of the asset. In some implementations, the tracking device may be appropriately mounted to an asset to increase exposure to sunlight and/or to reduce seasonal interference with the solar cells (e.g., due to snow and/or ice accumulation on the asset). For example, the tracking device may be mounted relatively high on the asset (e.g., to increase exposure to sunlight) and/or on a vertical surface (e.g., to reduce snow and/or ice accumulation on the tracking device).

As further shown in FIG. 1A, and by reference number 105, the tracking device (e.g., a processor in the tracking device) may receive battery information and/or solar charging information. In some implementations, the battery information may include a state of charge and/or a temperature for the battery. The solar charging information may include an output for the solar array, which may vary with variations in solar energy (as shown by reference number 110) and/or time of day. As further shown by reference number 105, the tracking device may configure an operation state for the tracking device based on the battery information and/or the solar charging information. For example, the tracking device may selectively turn on and/or off a cellular radio, a short-range radio, and/or a satellite navigation system receiver. Additionally, or alternatively, the tracking device may adjust a time and/or frequency with which the tracking device determines location information and/or reports location information.

As shown in FIG. 1B, and by reference number 115, assume that the tracking device has detected an event (e.g., expiration of a timer and/or an acceleration event). Based on detecting the event, the tracking device may determine whether to determine a location (e.g., whether the tracking device should wake up), as further shown by reference number 115.

As further shown in FIG. 1B, assume that the tracking device has determined (e.g., based on an operation state for the tracking device) that the tracking device should determine a location. As further shown by reference number 115, and based on the tracking device having determined that the tracking device should determine a location, the tracking device may determine a location (e.g., for the tracking device) based on navigation system information (e.g., a GPS signal) that the tracking device received from the satellite navigation system (as shown by reference number 120).

Based on having determined the location, the tracking device may send location information to a tracking server via a cellular network (as shown by reference number 125), to a user device via the cellular network (as shown by reference number 130), and/or directly (e.g., via BLUETOOTH) to the user device (as shown by reference number 135). As shown by reference number 140, and based on having sent the location information, the tracking device may selectively turn off one or more of its radios based on its operation state (e.g., to conserve resources) and may resume monitoring for an event (e.g., expiration of a timer, an acceleration event, and/or a message to determine and/or report a location).

As shown in FIG. 1C, assume that the tracking device is monitoring for a message to determine and/or report a location (e.g., that the tracking device has a BLUETOOTH radio and/or a cellular radio turned on). Further assume that the tracking device has received a wake-up message (e.g., from a tracking server via a cellular network (as shown by reference number 145), from a user device via the cellular network (as shown by reference number 150), and/or directly (e.g., via BLUETOOTH) from the user device (as shown by reference number 155)). As shown by reference number 160, and based on receiving a wake-up message, the tracking device may determine whether to determine a location.

As further shown in FIG. 1C, assume that the tracking device has determined that the tracking device should determine a location (e.g., based on the operation state for the tracking device). As further shown by reference number 160, and based on the tracking device having determined that the tracking device should determine a location, the tracking device may determine a location (e.g., for the tracking device) based on navigation system information (e.g., a GPS signal) that the tracking device received from the satellite navigation system (as shown by reference number 165).

Based on having determined the location, the tracking device may send location information to the tracking server via the cellular network (as shown by reference number 170), to the user device via the cellular network (as shown by reference number 175), and/or directly (e.g., via BLUETOOTH) to the user device (as shown by reference number 180). As shown by reference number 185, and based on having sent the location information, the tracking device may selectively turn off one or more of its radios based on its operation state (e.g., to conserve resources) and may resume monitoring for an event (e.g., expiration of a timer, an acceleration event, and/or a message to determine and/or report a location).

In this way, implementations described herein may enable dynamic energy storage management (e.g., dynamic battery management or the like), in solar-powered tracking devices, based on energy storage information and/or solar charging information. Enabling dynamic energy storage management in solar-powered tracking devices may reduce an amount of time during which radios are active, which may reduce power consumed by the tracking device. Reducing power consumed by the tracking device may conserve energy stored for the tracking device (e.g., in a battery).

Enabling dynamic energy storage management in solar-powered tracking devices may further enable solar-powered tracking devices to more closely align power consumption with available energy resources (e.g., a battery and/or a solar array). For example, dynamic energy storage management may enable solar-powered tracking devices to conserve energy when an energy storage component has a low charge state and/or when a solar array has a low output (e.g., due to adverse weather and/or time of day). Alternatively, dynamic energy storage management may enable solar-powered tracking devices to increase functionality (e.g., to provide more reporting options and/or an increased reporting frequency) when additional power is available (e.g., when an energy storage component is fully charged and/or when a solar array has a high output (e.g., due to direct sunlight)). Dynamic energy storage management may additionally preserve energy storage component (e.g., battery) lifespan by limiting discharge when solar power is available.

As indicated above, FIGS. 1A-1C are provided merely as an example. Other examples are possible and may differ from what was described with regard to FIGS. 1A-1C.

Figure 2:
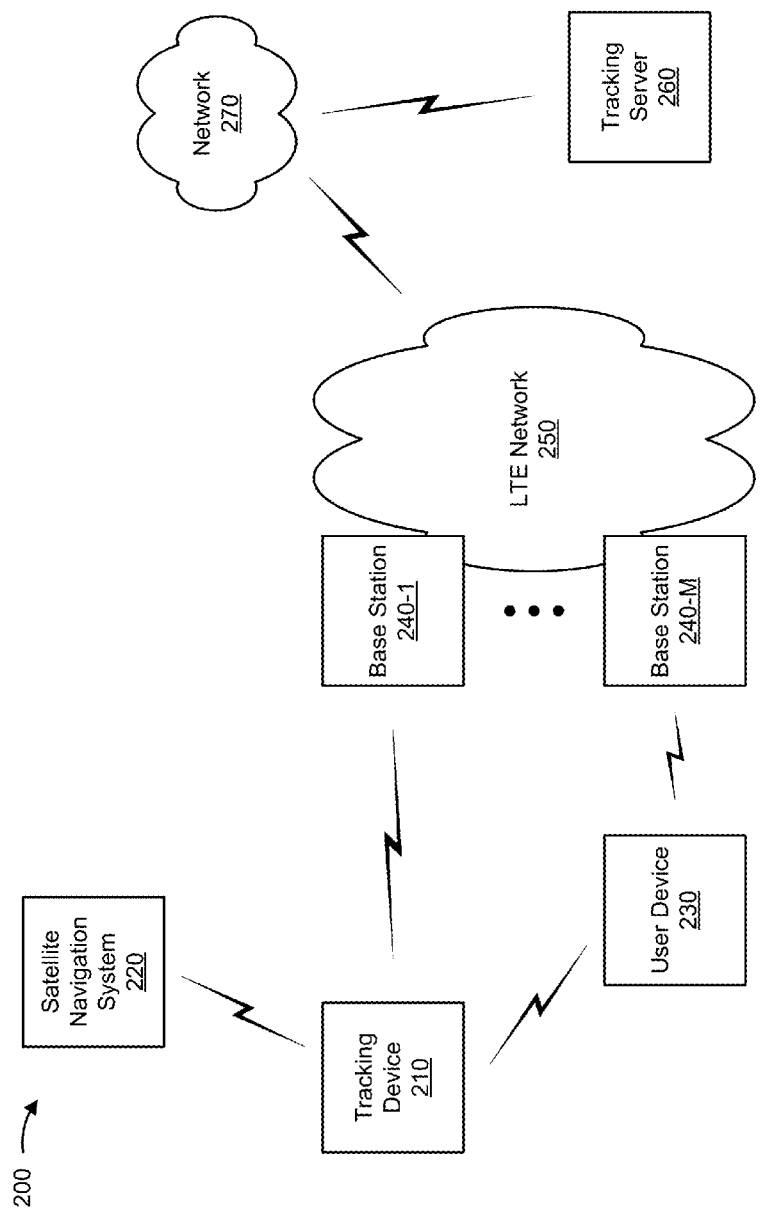
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a tracking device 210, a satellite navigation system 220, a user device 230, one or more base stations 240-1 through 240-M (M≥1) (hereinafter referred to collectively as "base stations 240," and individually as "base station 240"), a long term evolution (LTE) network 250, a tracking server 260, and a network 270. Devices of environment 200 may interconnect via wired connections, wireless connections, or a combination of wired and wireless connections.

Some implementations are described herein as being performed in connection with an LTE network for explanatory purposes. Some implementations may be performed in connection a network that is not an LTE network, such as a third generation (3G) network, a code division multiple access (CDMA) network, or another type of network.

Tracking device 210 includes one or more devices capable of gathering, receiving, storing, processing, providing, and/or transmitting information and/or data. For example, tracking device 210 may include a position sensor (e.g., a receiver for use with a space-based satellite navigation system, such as satellite navigation system 220) and one or more sensors (e.g., an accelerometer, a gyroscope, or the like) to detect movement of tracking device 210. In some implementations, tracking device 210 may have an associated mounting component (e.g., mechanical fasteners, adhesive, a magnet (e.g., a neodymium or other type of rare-earth magnet), or the like) to attach tracking device 210 to an asset (e.g., a vehicle (e.g., a bus, a truck, a trailer, a tractor, or the like), a machine, a shipping container, and/or another type of movable asset) to be tracked. In some implementations, tracking device 210 may be capable of communicating with user device 230 and/or tracking server 260 via a wireless network (e.g., LTE network 250 and/or network 270). In some implementations, tracking device 210 may be capable of communicating with user device 230 via short-range wireless communication (e.g., BLUETOOTH, BLUETOOTH low energy, ZIGBEE (e.g., as defined in the Institute of Electrical and Electronics Engineers' (IEEE) 802.15.4 standard), or the like).

Satellite navigation system 220 includes a space-based satellite navigation system (e.g., a global navigation satellite system (GNSS), such as GPS, the Russian GLONASS system, the Chinese BeiDou navigation satellite system, the European Union's Galileo system, or the like) that provides location and/or time information in all weather conditions, anywhere on and/or near the Earth where there is an unobstructed line of sight to four or more satellites (e.g., GPS satellites). In some implementations, satellite navigation system 220 may be used to provide location information (e.g., GPS coordinates) associated with tracking device 210.

User device 230 includes one or more devices capable of communicating with one or more other devices included in environment 200 (e.g., directly or via LTE network 250 and/or network 270). For example, user device 230 may include a wired communication device, a wireless communication device, a radiotelephone, a personal communications system (PCS) terminal (e.g., that may combine a cellular radiotelephone with data processing and data communications capabilities), a smart phone, a desktop computer, a laptop computer, a tablet computer, a personal gaming system, a wearable communication device (e.g., a pair of smart eyeglasses or a smart watch), and/or a similar device. In some implementations, user device 230 may be capable of communicating with tracking device 210 via a wireless network (e.g., LTE network 250). In some implementations, user device 230 may be capable of communicating directly with tracking device 210 via wired and/or short-range wireless communication (e.g., BLUETOOTH, BLUETOOTH low energy, ZIGBEE, or the like). In some implementations, user device 230 may include an application (e.g., a mobile app) for interaction with tracking device 210 and/or tracking server 260.

Base station 240 includes one or more devices capable of transferring traffic, such as audio, video, text, and/or other traffic, destined for and/or received from tracking device 210 and/or user device 230. In some implementations, base station 240 may include an evolved Node B (eNB) associated with LTE Network 250 that receives traffic from and/or sends traffic to network 270 (e.g., via a serving gateway (SGW) and/or a packet data network gateway (PGW)). Additionally, or alternatively, one or more base stations 240 may be associated with a radio access network that is not associated with an LTE network. Base station 240 may send traffic to and/or receive traffic from tracking device 210 and/or user device 230 via an air interface. In some implementations, base station 240 may include a small cell base station, such as a base station of a microcell, a picocell, and/or a femtocell. In some implementations, base station 240 may correspond to an access point of a non-cellular network, such as a WIFI network.

LTE network 250 may include an evolved packet system (EPS) and/or an evolved packet core (EPC) that operate based on a third generation partnership project (3GPP) wireless communication standard. LTE Network 250 may be associated with a radio access network that includes one or more base stations 240 that take the form of eNBs via which tracking device 210 and/or user device 230 may communicate with the EPC. The EPC may include a mobility management entity device (MME), an SGW, and/or a PGW that enable tracking device 210 and/or user device 230 to communicate with network 270 and/or an Internet protocol (IP) multimedia subsystem (IMS) core. The IMS core may include a home subscriber server (HSS) and/or an authentication, authorization, and accounting server (AAA). The HSS and/or AAA may reside in the EPC and/or the IMS core. In some implementations, LTE network 250 may correspond to or include a WIFI network.

Tracking server 260 includes one or more devices, such as one or more server devices, capable of receiving, processing, and/or providing information. For example, tracking server 260 may include a computing device (e.g., a desktop computer, a laptop computer, a tablet computer, a handheld computer, a server computer, a smart phone, a gaming device, a computer cluster, a cloud computer, or the like). In some implementations, tracking server 260 may receive (e.g., via LTE network 250 and/or network 270) information from tracking device 210.

Network 270 includes one or more wired and/or wireless networks. For example, network 270 may include a cellular network (e.g., an LTE network, a 3G network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
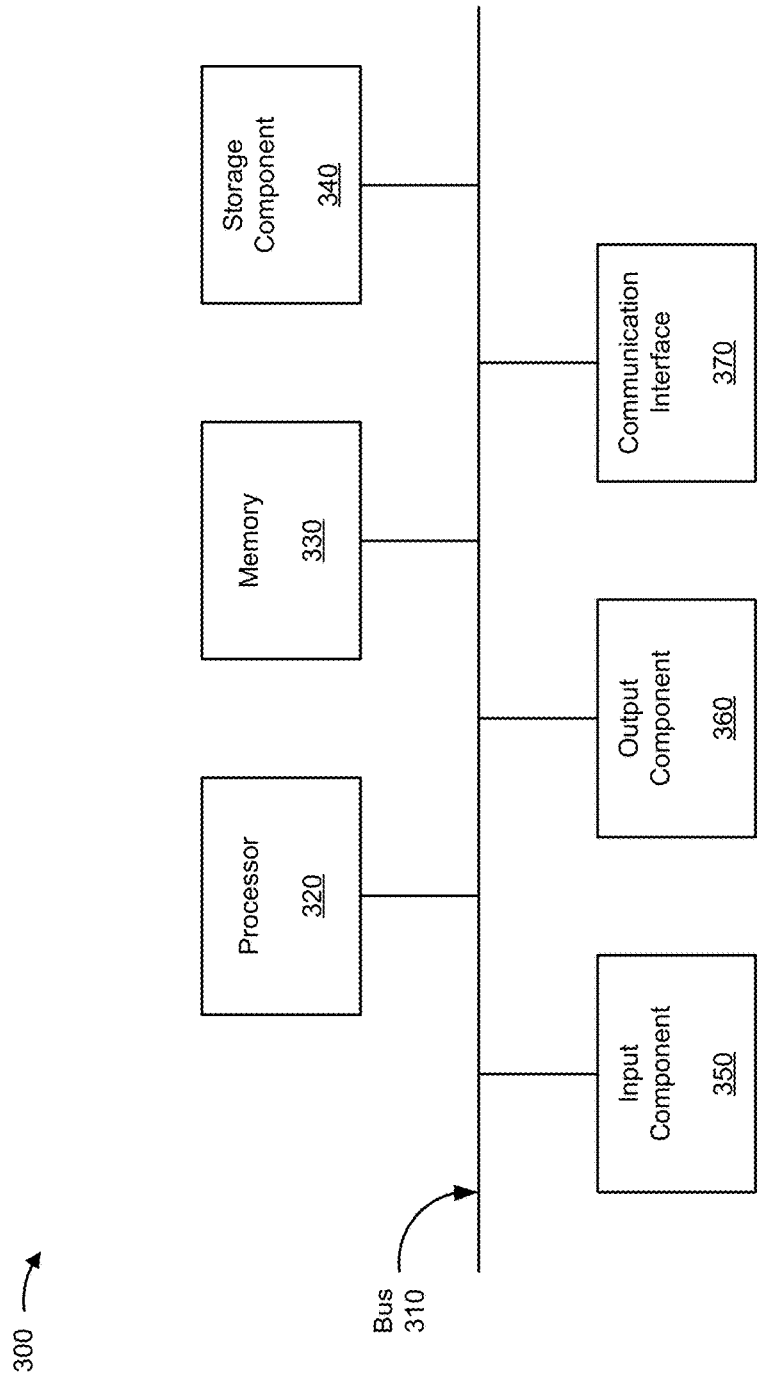
FIG. 3 is a diagram of example components of one or more devices of FIG. 2.

FIG. 3 is a diagram of example components of a device 300. Device 300 may correspond to tracking device 210, satellite navigation system 220, user device 230, base station 240, and/or tracking server 260. In some implementations, tracking device 210, satellite navigation system 220, user device 230, base station 240, and/or tracking server 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a WIFI interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
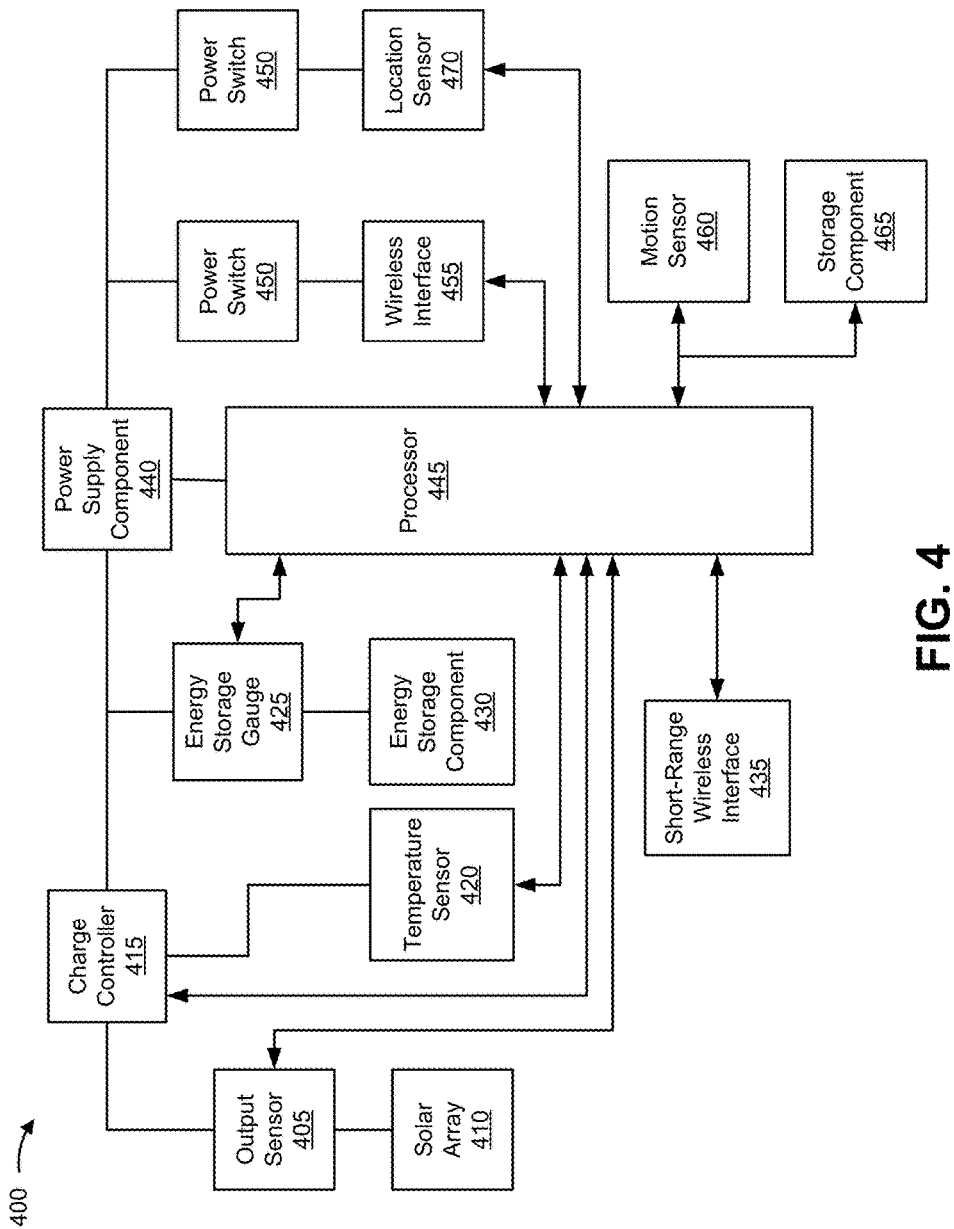
FIG. 4 is a diagram of example components of one or more devices of FIG. 2.

FIG. 4 is a diagram of example components of a device 400. Device 400 may correspond to tracking device 210, user device 230, base station 240, and/or tracking server 260. In some implementations, tracking device 210, user device 230, base station 240, and/or tracking server 260 may include one or more devices 400 and/or one or more components of device 400. As shown in FIG. 4, device 400 may include an output sensor 405, a solar array 410, a charge controller 415, a temperature sensor 420, an energy storage gauge 425, an energy storage component 430, a short-range wireless interface 435, a power supply component 440, a processor 445, a power switch 450, a wireless interface 455, a motion sensor 460, a storage component 465, and a location sensor 470. In some implementations, the components of device 400 may be mounted in a water-resistant and/or a water-proof case.

Output sensor 405 includes a component to measure current and/or voltage being output from solar array 410. In some implementations, output sensor 405 may be an electrical circuitry component (e.g., a current sensor and/or a voltage sensor) that may provide instantaneous measurements and/or running average measurements of the current output and/or the voltage output from solar array 410. In some implementations, output sensor 405 may provide current output and/or voltage output information, for solar array 410, to charge controller 415 (e.g., to support charging of energy storage component 430) and/or to processor 445 for processing.

Solar array 410 includes one or more solar cells (e.g., photovoltaic (PV) cells) and/or solar panels that may convert light (e.g., sunlight) into electric current using the photovoltaic effect.

Charge controller 415 includes a component to manage charging (e.g., by solar array 410 and/or by an external power source) of energy storage component 430. In some implementations, charge controller 415 may be an electrical circuitry component that may utilize maximum power point tracking (MPPT) to maximize power output from solar array 410 (e.g., by adjusting a load applied to solar array 410 to obtain a maximum power output, from solar array 410, based on environmental conditions (e.g., available light and temperature)). In some implementations, charge controller 415 may provide charging information, for energy storage component 430, to processor 445 for processing.

Temperature sensor 420 includes a component (e.g., an electrical circuitry component, such as a thermistor, a thermocouple, or the like) that may determine a temperature of energy storage component 430. In some implementations, temperature sensor 420 may provide temperature information, for energy storage component 430, to charge controller 415 (e.g., to support charging of energy storage component 430) and/or processor 445 for processing.

Energy storage gauge 425 includes a component (e.g., an electrical circuitry component, such as a battery fuel gauge) that may determine a voltage and/or a charge state (e.g., an amount of charge remaining in energy storage component 430 and/or how much longer energy storage component 430 can continue providing power (e.g., under specified operating conditions)). In some implementations, energy storage gauge 425 may provide voltage and/or charge state information, for energy storage component 430, to processor 445 for processing.

Energy storage component 430 includes a component (e.g., a battery, such as a nickel-metal hydride (NiMH), a lithium-ion (li-ion) battery, or another type of rechargeable battery, and/or a supercapacitor (SC)) that may store energy and provide power to other components of device 400.

Short-range wireless interface 435 includes a transceiver-like component (e.g., a transceiver and/or a separate receiver and transmitter) that enables device 400 to communicate with other devices, such as via a short-range and/or a low-power wireless connection. For example, short-range wireless interface 435 may be an electrical circuitry component (e.g., a radio, such as a transceiver and/or a separate receiver and transmitter) that may enable device 400 to communicate with other devices via BLUETOOTH, BLUETOOTH low energy, WIFI (e.g., using a wireless local area network (WLAN) based on the IEEE's 802.11 standards), ZIGBEE, or the like. In some implementations, short-range wireless interface 435 may include a suitable antenna. In some implementations, short-range wireless interface 435 may be incorporated into (e.g., on a single chip, or set of chips, with) processor 445.

Power supply component 440 includes a component that may manage power input (e.g., from solar array 410, charge controller 415, and/or energy storage component 430) to various components of device 400. In some implementations, power supply component 440 may include a direct current to direct current (DC-DC) converting electrical circuitry component (e.g., a switching regulator, such as a "buck" or "step-down" regulator) to convert a voltage (e.g., about 5V to about 8.4V), output from solar array 410, charge controller 415, and/or energy storage component 430, to a lower voltage (e.g., about 3.3V to about 3.8V) to be used by various components of device 400. In some implementations, device 400 may include multiple power supply components 440, which may provide different output voltages (e.g., about 3.3V or about 3.8V) to various components of device 400.

Processor 445 includes a processor, a microprocessor, a microcontroller, and/or any processing component that interprets and/or executes instructions. In some implementations, processor 445 includes one or more processors capable of being programmed to perform a function. In some implementations, processor 445 may time stamp and/or store (e.g., in storage component 465) various data (e.g., data from output sensor 405, solar array 410, charge controller 415, temperature sensor 420, energy storage gauge 425, energy storage component 430, short-range wireless interface 435, power supply component 440, processor 445, power switch 450, wireless interface 455, motion sensor 460, and/or location sensor 470). In some implementations, processor 445 may cause device 400 to transmit (e.g., via short-range wireless interface 435 and/or wireless interface 455), to another device, various data (e.g., data from output sensor 405, solar array 410, charge controller 415, temperature sensor 420, energy storage gauge 425, energy storage component 430, short-range wireless interface 435, power supply component 440, processor 445, power switch 450, wireless interface 455, motion sensor 460, and/or location sensor 470).

Power switch 450 includes a component to selectively (e.g., under the control of processor 445) provide power to wireless interface 455 and/or location sensor 470. In some implementations, power switch 450 may be integrated into wireless interface 455 and/or power switch 450 may be integrated into location sensor 470. In some implementations, power switch 450 may include an electrical circuitry component (e.g., a switching regulator) to control power supplied to wireless interface 455 and/or location sensor 470.

Wireless interface 455 includes a transceiver-like component (e.g., a transceiver and/or a separate receiver and transmitter) that enables device 400 to communicate with other devices, such as via a wireless connection. For example, wireless interface 455 may include a cellular network interface (e.g., an electrical circuitry component, such as a cellular radio, a cellular modem, or the like) to permit device 400 to establish a connection with a cellular network (e.g., with LTE network 250 via base station 240). In some implementations, wireless interface 455 may include a suitable antenna.

Motion sensor 460 includes a sensor designed to directly or indirectly detect motion and/or orientation of a device (e.g., tracking device 210 and/or user device 230). For example, motion sensor 460 may include an electrical circuitry component that is based on an accelerometer, a gyroscope, a proximity sensor, a barometric pressure sensor, a magnetometer, a temperature sensor, a light sensor (e.g., a photodiode sensor), an altimeter, an infrared sensor, an audio sensor, and/or another type of sensor. In some implementations, motion sensor 460 may determine three motion values and/or three orientation values, each corresponding to motion and/or orientation associated with one of three orthogonal axes (e.g., an X-axis, a Y-axis, and a Z-axis). In some implementations, motion sensor 460 may provide motion and/or orientation information to processor 445 for processing and/or to storage component 465 for storage. In some implementations, motion sensor 460 may include one or more microelectromechanical systems (MEMS) sensors.

Storage component 465 includes a RAM, a ROM, and/or another type of dynamic or static storage device (e.g., a flash memory, a magnetic memory, and/or an optical memory) that stores information for use by processor 445 and/or transmission via short-range wireless interface 435 and/or wireless interface 455.

Location sensor 470 includes a sensor designed to determine the geographic location (e.g., a latitude, a longitude, an altitude, etc.) of a device (e.g., tracking device 210 and/or user device 230). For example, location sensor 470 may include an electrical circuitry component that is based on a GNSS-based sensor (e.g., a GPS-based sensor, a GLONASS-based sensor, a BeiDou-based sensor, a Galileo-based sensor, or the like) or another type of sensor used to determine a location. In some implementations, location sensor 470 may include an associated antenna for a GNSS-based sensor. In some implementations, the location information, determined by location sensor 470, may be provided to processor 445 for processing and/or to storage component 465 for storage. In some implementations, location sensor 470 may augment a GPS satellite signal by using cell tower data (e.g., from one or more base stations 240) to provide assisted GPS (A-GPS).

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for energy storage management in solar-powered tracking devices. In some implementations, one or more process blocks of FIG. 5 may be performed by tracking device 210. In some implementations, one or more process blocks of FIG. 5 may be performed by another device or a group of devices separate from or including tracking device 210, such as satellite navigation system 220, user device 230, base station 240, and/or tracking server 260.

As shown in FIG. 5, process 500 may include receiving energy storage information and/or solar charging information (block 510). For example, processor 445 of tracking device 210 may receive energy storage information and/or solar charging information.

Energy storage information (e.g., for energy storage component 430 of tracking device 210) may include a current charge state (e.g., as a percentage of a fully charged state), a prior day's peak charge state (e.g., a peak charge state, as a percentage of a fully charged state, from the preceding day), a voltage (e.g., a battery pack voltage when energy storage component 430 is a battery pack), a single element voltage (e.g., a single cell voltage when energy storage component 430 is a battery pack), and/or a temperature (e.g., a battery pack temperature when energy storage component 430 is a battery pack).

Solar charging information (e.g., for solar array 410 of tracking device 210) may include an output current (e.g., an instantaneous output current, an average output current, or the like), an output voltage, and/or a time of day. In some implementations, the output current for solar array 410 may be indicative of whether solar array is receiving full or partial sun (e.g., due to weather conditions), an orientation of solar array 410 with regard to the sun, and/or a time of day (e.g., based on reduced output current early and/or later in the day).

In some implementations, processor 445 may receive energy storage information from energy storage gauge 425 of tracking device 210 and/or from temperature sensor 420 of tracking device 210. In some implementations, processor 445 may receive, from storage component 465 of tracking device 210, energy storage information that was previously obtained by energy storage gauge 425 and/or by temperature sensor 420.

In some implementations, processor 445 may receive solar charging information from output sensor 405 of tracking device 210 and/or from charge controller 415 of tracking device 210. In some implementations, processor 445 may receive, from storage component 465 of tracking device 210, solar charging information that was previously obtained by output sensor 405 and/or by charge controller 415.

In some implementations, processor 445 may receive energy storage information and/or solar charging information upon occurrence of a trigger event. For example, based on processor 445 determining that a trigger event has occurred, processor 445 may obtain energy storage information and/or solar charging information (e.g., from energy storage gauge 425, temperature sensor 420, output sensor 405, charge controller 415, and/or storage component 465).

In some implementations, the trigger event may include a time-based event. For example, processor 445 may determine that a period of time corresponding to a time value has passed (e.g., since a prior event), that a timer (e.g., based on the time value) has expired, or the like. In some implementations, the period of time and/or the timer may have started based on tracking device 210 having previously determined location information (as described below in connection with block 540) and/or having previously sent location information to another device (as described below in connection with block 550). In some implementations, tracking device 210 may set and/or adjust the time value based on the energy storage information and/or the solar charging information (as described below in connection with Block 520).

In some implementations, the trigger event may include detecting movement of tracking device 210. For example, motion sensor 460 may determine that tracking device 210 has moved. In some implementations, motion sensor 460 may determine that tracking device 210 has moved based on motion sensor 460 detecting an acceleration event. For example, motion sensor 460 may determine that tracking device 210 has moved based on motion sensor 460 detecting an acceleration value that is greater than an acceleration threshold (e.g., an acceleration that is greater than about 0.5 meters per second squared ($m/s^2$) or about 0.05 g).

In some implementations, the trigger event may include receiving, from another device, a message (e.g., a wake-up message). For example, tracking device 210 may receive, from user device 230 and/or tracking server 260, a message (e.g., short message service (SMS) message) requesting location information from tracking device 210. In some implementations, tracking device 210 may receive the message from user device 230 and/or tracking server 260 via base station 240 (e.g., via LTE network 250). In some implementations, tracking device 210 may receive the message directly from user device 230 (e.g., via short-range wireless interface 435, such as via BLUETOOTH, BLUETOOTH low energy, ZIGBEE, or the like).

In some implementations, tracking device 210 may receive the message over an active communication interface (e.g., a communication interface that is turned on to receive messages, as described below in connection with Block 520). For example, tracking device 210 may receive the message via short-range wireless interface 435 when short-range wireless interface 435 is turned on. Additionally, or alternatively, tracking device 210 may receive the message via wireless interface 455 when wireless interface 455 is turned on.

As further shown in FIG. 5, process 500 may include setting, based on the energy storage information and/or the solar charging information, a time value and/or a radio operation state (block 520). For example, having received energy storage information and/or solar charging information, tracking device 210 may set, based on the energy storage information and/or the solar charging information, a time value and/or a radio operation state.

The time value may be an interval, a frequency, a period, a specific time (e.g., a time of day or a date and time), or the like. In some implementations, the time value may be a time interval specified as a number of minutes (e.g., N minutes, where N≥1). In some implementations, tracking device 210 may use the time value to set a number of times per hour and/or per day that tracking device 210 determines location information. As will be described below in connection with block 530, tracking device 210 may use the time value to determine whether tracking device 210 should determine location information (e.g., based on a time since a prior determination of location information).

In some implementations, tracking device 210 may set a baseline time value. For example, tracking device 210 may set a baseline time value of sixty minutes (e.g., N=60).

In some implementations, tracking device 210 may set the time value by adjusting a previously set time value (e.g., the baseline time value or another previously set time value). For example, tracking device 210 may adjust the time values based on energy storage information and/or solar charging information that meets, or fails to meet, various threshold values. Although the following description includes example threshold values and/or ranges, other threshold values and/or ranges are possible. In some implementations, the threshold values and/or ranges may be user-settable parameters.

In some implementations, tracking device 210 may adjust the time value by adding time to a previously set time value to increase the time value. Increasing the time value may extend an interval between instances of tracking device 210 determining location information (e.g., decrease a frequency with which tracking device 210 determines location information). Decreasing the frequency with which tracking device 210 determines location information may reduce a rate at which tracking device 210 consumes resources (e.g., power), which may conserve energy stored by energy storage component 430.

In some implementations, tracking device 210 may set the time value by adding a number of minutes to a previously set time value. For example, tracking device 210 may increase the time value (e.g., by setting N=10 when N<10 or by setting N=N+10 when N≥10, up to a maximum time value of N=1440 (e.g., 24 hours)) when the current charge state for energy storage component 430 is above a first charge threshold (e.g., greater than about 75% of a full charge), but below a prior day's peak charge state, and an output current for solar array 410 is below a solar threshold (e.g., less than about 95% of a maximum output current from solar array 410). In some implementations, the solar threshold may be indicative of full sunlight reaching solar array 410.

In some implementations, tracking device 210 may increase the time value (e.g., by setting N=10 when N<10 or by adding 60 minutes when N≥10, up to a maximum time value of N=1440 (e.g., 24 hours)) when the current charge state for energy storage component 430 is below a second charge threshold (e.g., less than about 25%), the voltage for energy storage component 430 is below a component voltage threshold, a single element voltage (e.g., a single cell voltage where energy storage component 430 is a battery) is below an element voltage threshold, and/or the temperature for energy storage component 430 is outside a temperature range (e.g., the temperature is less than −20 degree Celsius or more than 85 degrees Celsius). In some implementations (e.g., when energy storage component 430 includes a battery), a voltage below the component voltage threshold, a single element voltage below an element voltage threshold, and/or a temperature that is outside the temperature range may indicate a distressed state and/or a lowered charge capacity for energy storage component 430.

In some implementations, tracking device 210 may adjust the time value by subtracting time from a previously set time value to decrease the time value. Decreasing the time value may reduce an interval between instances of tracking device 210 determining location information (e.g., increase a frequency with which tracking device 210 determines location information). Increasing the frequency with which tracking device 210 determines location information may more fully utilize power resources (e.g., when solar array is receiving direct sunlight and/or when the current charge state indicates that energy storage component 430 has a substantial portion of a full charge) and/or may provide more detailed tracking of an asset to which tracking device 210 is attached.

In some implementations, tracking device 210 may set the time value by subtracting a number of minutes from a previously set time value. For example, tracking device 210 may decrease the time value (e.g., by setting N=N−10 when N≥20 or by setting N=N−1 when N<10, down to a minimum time value of N=1 (e.g., 1 minute)) when the current charge state for energy storage component 430 is above a third charge threshold (e.g., greater than about 50% of a full charge) and/or an output current for solar array 410 is above the solar threshold (e.g., greater than about 95% of the maximum output current from solar array 410).

In some implementations, tracking device 210 may decrease the time value (e.g., by setting N=N−20 when N≥30 or by setting N=N−1 when N<10, down to a minimum time value of N=1 (e.g., 1 minute)) when the current charge state for energy storage component 430 is above the first charge threshold (e.g., greater than about 75% of a full charge) and/or is above a prior day's peak charge state. In some implementations, tracking device 210 may decrease the time value (e.g., by setting N=N−30 when N≥40 or by setting N=N−1 when N<10, down to a minimum time value of N=1 (e.g., 1 minute)) when the current charge state for energy storage component 430 is above a fourth charge threshold (e.g., greater than about 90% of a full charge).

The radio operation state may indicate whether a radio associated with tracking device 210 (e.g., short-range wireless interface 435, wireless interface 455, and/or location sensor 470) should normally be powered on or should normally be powered off. In some implementations, the radio operation state for tracking device 210 may correspond to a combination of radio operation states for short-range wireless interface 435, wireless interface 455, and/or location sensor 470.

In some implementations, tracking device 210 may set a radio operation state for short-range wireless interface 435. For example, tracking device 210 may determine that short-range wireless interface 435 should normally be on (e.g., a radio operation state of ShortNormalON). In the ShortNormalON radio operation state, short-range wireless interface 435 may be powered on and in a scanning mode (e.g., listening for a previously connected device to come into range). Alternatively, tracking device 210 may determine that short-range wireless interface 435 should normally be off (e.g., a radio operation state of ShortNormalOFF). In some implementations, ShortNormalOFF may be a default radio operation state for short-range wireless interface 435.

In some implementations, tracking device 210 may set a radio operation state for wireless interface 455. For example, tracking device 210 may determine that wireless interface 455 should normally be on (e.g., a radio operation state of CellNormalON). In the CellNormalON radio operation state, wireless interface 455 may be powered on and in a listen mode (e.g., listening for messages being sent, to tracking device 210, over LTE network 250). Alternatively, tracking device 210 may determine that wireless interface 455 should normally be off (e.g., a radio operation state of CellNormalOFF). In some implementations, CellNormalOFF may be a default radio operation state for wireless interface 455.

In some implementations, tracking device 210 may set a radio operation state for location sensor 470. For example, tracking device 210 may determine that location sensor 470 should normally be on (e.g., a radio operation state of LocNormalON). In the LocNormalON radio operation state, location sensor 470 may be powered on and may periodically (e.g., based on the time value) determine location information for tracking device 210. Alternatively, tracking device 210 may determine that location sensor 470 should normally be off (e.g., a radio operation state of LocNormalOFF). In some implementations, LocNormalOFF may be a default radio operation state for location sensor 470.

In some implementations, tracking device 210 may set the radio operation state for tracking device 210 (e.g., whether short-range wireless interface 435, wireless interface 455, and/or location sensor 470 should normally be powered on or should normally be powered off) based on the energy storage information and/or the solar charging information meeting, or failing to meet, various threshold values. Although the following description includes example threshold values and/or ranges, other threshold values and/or ranges are possible. In some implementations, the threshold values and/or ranges may be user-settable parameters.

In some implementations, tracking device 210 may configure tracking device 210 into an ALLOFF radio operation state. In the ALLOFF radio operation state, tracking device 210 may configure wireless interface 455 into the CellNormalOFF radio operation state, configure short-range wireless interface 435 into the ShortNormalOFF radio operation state, and/or configure location sensor 470 into the LocNormalOFF radio operation state. In some implementations, tracking device 210 may configure tracking device 210 into the ALLOFF radio operation state when the current charge state for energy storage component 430 is below the third charge threshold (e.g., less than about 50% of a full charge), the voltage for energy storage component 430 is below a component voltage threshold, a single element voltage is below an element voltage threshold, and/or the temperature for energy storage component 430 is outside a temperature range (e.g., the temperature is less than −20 degree Celsius or more than 85 degrees Celsius).

Configuring tracking device 210 into the ALLOFF radio operation state may conserve power when energy storage component 430 is discharged and/or exhibiting reduced capacity (e.g., due to distress, temperature, or the like) and/or when output from solar array 410 is reduced (e.g., due to cloud cover, shade, time of day or the like). Additionally, configuring tracking device 210 into the ALLOFF radio operation state may allow movement-based trigger events (e.g., movement of tracking device 210, as detected by motion sensor 460) and/or time-based trigger events (e.g., expiration of a timer).

In some implementations, tracking device 210 may configure tracking device 210 into a CELLONLY radio operation state. In the CELLONLY radio operation state, tracking device 210 may configure wireless interface 455 into the CellNormalON radio operation state, configure short-range wireless interface 435 into the ShortNormalOFF radio operation state, and/or configure location sensor 470 into the LocNormalOFF radio operation state. In some implementations, tracking device 210 may configure tracking device 210 into the CELLONLY radio operation state when the current charge state for energy storage component 430 is above the third charge threshold (e.g., greater than about 50% of a full charge), the current charge state is below the fourth charge threshold (e.g., less than about 90% of a full charge), the current charge state is above a prior day's peak charge state, and/or the output current for solar array 410 is below the solar threshold (e.g., less than about 95% of the maximum output current from solar array 410, which may indicate that solar array 410 is blocked from receiving full sunlight).

Configuring tracking device 210 into the CELLONLY radio operation state may conserve energy (e.g., by limiting use of short-range wireless interface 435 and/or location sensor 470). Additionally, configuring tracking device 210 into the CELLONLY radio operation state may allow movement-based trigger events, time-based trigger events, and/or message-based trigger events (e.g., based on tracking device 210 receiving messages, via wireless interface 455, from user device 230 and/or tracking server 260).

In some implementations, tracking device 210 may configure tracking device 210 into a GPSOFF radio operation state. In the GPSOFF radio operation state, tracking device 210 may configure wireless interface 455 into the CellNormalON radio operation state, configure short-range wireless interface 435 into the ShortNormalON radio operation state, and/or configure location sensor 470 into the LocNormalOFF radio operation state. In some implementations, tracking device 210 may configure tracking device 210 into the GPSOFF radio operation state when the current charge state for energy storage component 430 is above the fourth charge threshold (e.g., greater than about 90% of a full charge) and/or the output current for solar array 410 is above the solar threshold (e.g., full sunlight is reaching solar array 410).

Configuring tracking device 210 into the GPSOFF radio operation state may conserve energy (e.g., by limiting use of location sensor 470). Additionally, configuring tracking device 210 into the GPSOFF radio operation state may allow movement-based trigger events, time-based trigger events, and/or message-based trigger events (e.g., based on tracking device 210 receiving messages via wireless interface 455 and/or short-range wireless interface 435).

In some implementations, tracking device 210 may configure tracking device 210 into an ALLON radio operation state. In the ALLON radio operation state, tracking device 210 may configure wireless interface 455 into the CellNormalON radio operation state, configure short-range wireless interface 435 into the ShortNormalON radio operation state, and/or configure location sensor 470 into the LocNormalON radio operation state. In some implementations, tracking device 210 may configure tracking device 210 into the ALLON radio operation state when the current charge state for energy storage component 430 is above the fourth charge threshold (e.g., greater than about 90% of a full charge) and/or the output current for solar array 410 is above the solar threshold (e.g., full sunlight is reaching solar array 410). Configuring tracking device 210 into the ALLON radio operation state may allow tracking device 210 to use all components (e.g., when energy storage component 430 is fully charged and/or solar array 410 is receiving full sunlight).

In some implementations, tracking device 210 may set the radio operation state based on a time of day. For example, tracking device 210 may set a radio operation state (e.g., the ALLOFF radio operation state or the CELLONLY radio operation state) to conserve energy due to lack of light being received by solar array 410 when the time of day is within a predetermined range (e.g., between sunset and sunrise). In some implementations, tracking device 210 may set the radio operation state based on the time of day, in combination with the energy storage information and/or the solar charging information. For example, tracking device 210 may set a radio operation state (e.g., the ALLOFF radio operation state or the CELLONLY radio operation state) to conserve energy based on determining that energy storage component 430 may not be fully charged (e.g., by solar array 410) before a predetermined time of day (e.g., before sunset).

In some implementations, tracking device 210 may monitor the output current for solar array 410 based on the time of day. For example, tracking device 210 may evaluate whether the output current corresponds to a predicted output current based on a time of day (e.g., a high output current during early afternoon hours). In some implementations, where output current is consistently lower than expected (e.g., based on a time of day), tracking device 210 may send a message (e.g., to tracking server 260) indicating a possible fault (e.g., with solar array 410 and/or charge controller 415).

In some implementations, tracking device 210 may automatically set the time value and/or the radio operation state or states (e.g., based on the energy storage information and/or the solar charging information). In some implementations, tracking device 210 may set the time value and/or the radio operation state or states based on input from a user. For example, tracking device 210 may receive user input (e.g., for default and/or initial values) regarding the time value and/or the radio operation state or states. Tracking device 210 may receive the user input from user device 230 (e.g., via BLUETOOTH and/or via LTE network 250) and/or from tracking server 260 (e.g., via LTE network 250). In some implementations, a user may provide user input regarding the time value and/or the radio operation state or states through a web page hosted by tracking server 260.

As further shown in FIG. 5, process 500 may include determining, based on the time value, whether to determine location information (block 530). For example, having set the time value and/or the radio operation state, tracking device 210 may determine, based on the time value, whether to determine location information (e.g., a latitude, a longitude, an altitude, etc.) for tracking device 210.

In some implementations, tracking device 210 may determine (e.g., based on the time value) whether tracking device 210 should determine, based on occurrence of a trigger event, location information. For example, when tracking device 210 detects a trigger event (e.g., a movement-based trigger event, a time-based trigger event, and/or a message-based trigger event), tracking device 210 may determine whether another trigger event of the same type has occurred within the preceding N minutes (e.g., a time value). Tracking device 210 may determine that tracking device 210 should not determine location information when a prior trigger event, of the same type, has occurred within the preceding N minutes.

In some implementations, tracking device 210 may determine that tracking device 210 should determine location information when tracking device 210 has not determined location information within a specified time period (e.g., 24 hours). In some implementations, the specified time period may be based on the time value.

As further shown in FIG. 5, process 500 may include determining location information (block 540). For example, having determined that tracking device 210 should determine the location information, tracking device 210 may determine location information (e.g., a latitude, a longitude, an altitude, etc.) for tracking device 210.

In some implementations, tracking device 210 may use location sensor 470 to determine the location information. For example, when the radio operation state for location sensor 470 is LocNormalON, location sensor 470 may determine the location information. When the radio operation state for location sensor 470 is LocNormalON, tracking device 210 may leave location sensor powered on after location sensor 470 has determined the location information.

Alternatively, when the radio operation state for location sensor 470 is LocNormalOFF, tracking device 210 may turn on location sensor 470, and location sensor 470 may then determine the location information. When the radio operation state for location sensor 470 is LocNormalOFF, tracking device 210 may turn off location sensor 470 after location sensor 470 has determined the location information.

In some implementations (e.g., where location sensor 470 is a GNSS-based sensor), tracking device 210 may obtain GNSS ephemeris data (e.g., orbital information, associated with each satellite of satellite navigation system 220, which allows a GNSS receiver to calculate positions of the satellites of satellite navigation system 220) via wireless interface 455. In some implementations, when the radio operation state for location sensor 470 is LocNormalOFF, tracking device 210 may obtain the GNSS ephemeris data, via wireless interface 455, prior to turning on location sensor 470. When the radio operation state for wireless interface 455 is CellNormalOFF, tracking device 210 may turn on wireless interface 455 prior to wireless interface 455 obtaining the GNSS ephemeris data.

Obtaining the ephemeris data via wireless interface 455 (e.g., via LTE network 250) may enable a faster startup (e.g., about 1-2 seconds) for location sensor 470 than if the ephemeris data were obtained from satellites of satellite navigation system 220 (e.g., about 30-60 seconds to obtain the ephemeris data from a satellite). Reducing startup time for location sensor 470 may reduce the time that location sensor 470 is powered on, which may reduce resources consumed by tracking device 210 to determine location information.

As further shown in FIG. 5, process 500 may include sending, to another device, the location information based on the radio operation state (block 550). For example, having determined the location information, tracking device 210 may send the location information, to another device (e.g., user device 230 and/or tracking server 260), based on the radio operation state.

In some implementations, tracking device 210 may use short-range wireless interface 435 and/or wireless interface 455 to send the location information. For example, tracking device 210 may use short-range wireless interface 435 to send (e.g., via BLUETOOTH, BLUETOOTH low energy, ZIGBEE, or the like) the location information, to user device 230, when short-range wireless interface 435 is able to connect to user device 230. Additionally, or alternatively, tracking device 210 may use wireless interface 455 to send the location information, to user device 230 and/or tracking server 260, via base station 240 and LTE network 250.

In some implementations, tracking device 210 may determine whether tracking device 210 should send the location information, to another device, based on the radio operation state. For example, when the radio operation state for short-range wireless interface 435 is ShortNormalOFF and/or when the radio operation state for wireless interface 455 is CellNormalOFF, tracking device 210 may determine whether tracking device 210 has moved at least a predetermined distance (e.g., 10 meters) after previously sending location information. In some implementations, tracking device 210 may determine whether tracking device 210 has moved at least the predetermined distance by comparing the location information to stored location information (e.g., previously determined location information that was stored in storage component 465). In some implementations, tracking device 210 may not send the location information, to another device, when tracking device 210 determines that tracking device 210 has not moved at least the predetermined distance.

In some implementations, tracking device 210 may determine that tracking device 210 should send the location information when tracking device 210 has not sent location information within a specified time period (e.g., 24 hours). In some implementations, the specified time period may correspond to the time value.

In some implementations, short-range wireless interface 435 and/or wireless interface 455 may be active and available for tracking device 210 to transmit the location information. For example, when the radio operation state for short-range wireless interface 435 is ShortNormalON and/or when the radio operation state for wireless interface 455 is CellNormalON, short-range wireless interface 435 and/or wireless interface 455 may be active and available for tracking device 210 to send the location information to another device (e.g., user device 230 and/or tracking server 260).

In some implementations, tracking device 210 may activate short-range wireless interface 435 and/or wireless interface 455 to transmit the location information. For example, when the radio operation state for short-range wireless interface 435 is ShortNormalOFF and/or when the radio operation state for wireless interface 455 is CellNormalOFF, tracking device 210 may turn on short-range wireless interface 435 and/or turn on wireless interface 455 for tracking device 210 to use to send the location information to another device (e.g., user device 230 and/or tracking server 260).

In some implementations, tracking device 210 may deactivate short-range wireless interface 435 and/or wireless interface 455 after sending the location information (e.g., to enter a sleep mode). For example, when the radio operation state for short-range wireless interface 435 is ShortNormalOFF and/or when the radio operation state for wireless interface 455 is CellNormalOFF, tracking device 210 may, after sending the location information, turn off short-range wireless interface 435 and/or turn off wireless interface 455. After turning off short-range wireless interface 435 and/or wireless interface 455, tracking device 210 may monitor for occurrence of movement-based trigger events and/or time-based trigger events.

In some implementations, tracking device 210 may maintain short-range wireless interface 435 and/or wireless interface 455 in a powered on state after sending the location information. For example, when the radio operation state for short-range wireless interface 435 is ShortNormalON and/or when the radio operation state for wireless interface 455 is CellNormalON, tracking device 210 may maintain short-range wireless interface 435 and/or wireless interface 455 in a powered on state (e.g., to receive SMS messages requesting location information from tracking device 210) after sending the location information. Additionally, or alternatively, tracking device 210 may monitor for occurrence of movement-based trigger events and/or time-based trigger events after sending the location information.

In some implementations, tracking device 210 may store the location information (e.g., in storage component 465). In some implementations, tracking device 210 may delay (e.g., for a time interval based on the time value) sending the location information to another device and may store (e.g., in storage component 465) the location information before sending the location information to the other device. In some implementations, tracking device 210 may store additional information in storage component 465 (e.g., a time, the energy storage information, the solar charging information, the time value, and/or the radio operation state or states).

In some implementations, tracking device 210 may start a timer based on having sent the location information to another device. For example, tracking device 210 may start a timer based on the time value (e.g., for N minutes).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, implementations described herein may enable dynamic energy storage management (e.g., dynamic battery management or the like), in solar-powered tracking devices, based on energy storage information and/or solar charging information. Enabling dynamic energy storage management in solar-powered tracking devices reduces power consumption by enabling the tracking devices to selectively turn off radios.

Enabling dynamic energy storage management in solar-powered tracking devices may further enable solar-powered tracking devices to more closely align power consumption with available energy resources (e.g., a battery and/or a solar array). For example, dynamic energy storage management may enable solar-powered tracking devices to conserve energy when an energy storage component has a low charge state and/or when a solar array has a low output. Alternatively, dynamic energy storage management may enable solar-powered tracking devices to increase functionality (e.g., to provide more reporting options and/or an increased reporting frequency) when additional power is available (e.g., when an energy storage component is fully charged and/or when a solar array has a high output). Dynamic energy storage management may additionally preserve energy storage component (e.g., battery) lifespan by limiting battery discharge when solar power is available.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more memories;
one or more processors, communicatively coupled to the one or more memories, to:
detect occurrence of an event associated with the device,
the event related to at least one of:
a time related event,
a movement related event, or
a message related event;
receive energy storage information and solar charging information,
the energy storage information identifying a present charge state for an energy storage component,
the solar charging information identifying an output current for a solar array, and
the energy storage information and the solar charging information being received based on the occurrence of the event;
set a time value and a radio operation state based on the present charge state being greater than a charge threshold and the output current of the solar array being less than a solar threshold,
the solar threshold corresponding to a particular percentage of a maximum output current of the solar array,
the radio operation state being for a wireless interface of the device, and
the radio operation state for the wireless interface of the device being powered off when the present charge state is below the charge threshold;

determine, based on the time value, to determine location information;
determine the location information,
the location information being first location information;
determine, prior to determining the first location information, second location information;
determine a distance between a first location corresponding to the first location information and a second location corresponding to the second location information;
transmit, over the wireless interface, the first location information based on the radio operation state and the distance being greater than a threshold; and
turn off at least one radio after transmitting the location information over the wireless interface; and
one or more mounting tabs,
the one or more mounting tabs being configured to mount the device at a position on an asset to increase exposure to sunlight.

2. The device of claim 1,
where the one or more processors are further to:
determine, before determining the location information, that a timer has expired,
the timer being based on the time value; and
where the one or more processors, when determining, based on the time value, to determine the location information, are to:
determine, based on determining that the timer has expired, to determine the location information.

3. The device of claim 1, where the one or more processors are further to:
determine a time interval based on the time value; and
store the location information, after determining the location information and before transmitting the location information,
the location information being stored for at least the time interval before being transmitted over the wireless interface.

4. The device of claim 1, where the one or more processors, when determining, based on the time value, to determine the location information, are to:
determine, based on the time value and a time of day, to determine the location information.

5. The device of claim 1, where the one or more processors, when setting the time value, are to:
decrease the time value based on the present charge state of the energy storage component being greater than the charge threshold.

6. The device of claim 1, where the location information includes at least one of:
a latitude;
a longitude; or
an altitude.

7. The device of claim 1, where the time value and radio operation state are set by a user device.

8. A non-transitory computer-readable medium storing instructions, the instructions comprising:
one or more instructions that, when executed by one or more processors of a device, cause the one or more processors to:
detect occurrence of an event,
the event related to at least one of:
a time related event,
a movement related event, or
a message related event;
obtain solar charging information and information associated with an energy storage component,
the information associated with the energy storage component identifying a present charge state for the energy storage component,
the solar charging information identifying an output current for a solar array, and
the solar charging information and the information associated with the energy storage component being obtained based on the occurrence of the event;
set a radio operation state based on the present charge state being greater than a charge threshold and the output current of the solar array being less than a solar threshold,
the solar threshold corresponding to a particular percentage of a maximum output current of the solar array, and
the radio operation state for a wireless interface of the device being powered off when the present charge state is below the charge threshold;
determine whether a timer has expired;
determine location information based on determining that the timer has expired,
the location information being first location information;
determine, prior to determining the first location information, second location information;
determine a distance between a first location corresponding to the first location information and a second location corresponding to the second location information;
send, to another device, the first location information based on the radio operation state and the distance being greater than a threshold;
turn off at least one radio after sending the location information to the other device.

9. The non-transitory computer-readable medium of claim 8, where the one or more instructions, when executed by the one or more processors, further cause the one or more processors to:
set, based on at least one of the solar charging information or the information associated with the energy storage component, a time value; and
set, after sending the location information, the timer based on the time value.

10. The non-transitory computer-readable medium of claim 9, where the one or more instructions, that cause the one or more processors to set the time value, cause the one or more processors to:
decrease the time value based on the present charge state of the energy storage component being greater than the charge threshold.

11. The non-transitory computer-readable medium of claim 8, where the one or more instructions, that cause the one or more processors to turn off the at least one radio, cause the one or more processors to:
turn off the at least one radio based on the radio operation state.

12. The non-transitory computer-readable medium of claim 8, where the one or more instructions, that cause the one or more processors to detect the occurrence of the event, cause the one or more processors to:
determine at least one of that the device has moved or that the device has received a message from the other device.

13. The non-transitory computer-readable medium of claim 8,
where the solar charging information includes a time of day; and
where the one or more instructions, that cause the one or more processors to set the radio operation state, cause the one or more processors to:
set the radio operation state based on the time of day.

14. The non-transitory computer-readable medium of claim 8, where the one or more instructions, when executed by the one or more processors, further cause the one or more processors to:
activate at least one radio prior to determining the location information,
the at least one radio being activated after detecting the occurrence of the event.

15. A method, comprising:
detecting, by a device, occurrence of an event,
the event related to at least one of:
a time related event,
a movement related event, or
a message related event;
receiving, by the device, energy storage information and solar charging information,
the energy storage information identifying a present charge state for an energy storage component,
the solar charging information identifying an output current for a solar array, and
the energy storage information and the solar charging information being received based on the occurrence of the event;
setting, by the device, a radio operation state based on the present charge state being greater than a charge threshold and the output current of the solar array being less than a solar threshold,
the solar threshold corresponding to a particular percentage of a maximum output current of the solar array, and
the radio operation state for a wireless interface of the device being powered off when the present charge state is below the charge threshold;
determining, by the device and based on a timer having expired, location information,
the location information being first location information;
determine, prior to determining the first location information, second location information;
determine a distance between a first location corresponding to the first location information and a second location corresponding to the second location information;
sending, by the device and to another device, the first location information,
the first location information being sent based on the radio operation state and the distance being greater than a threshold; and
turning off, by the device, at least one radio after sending the location information to the other device,
the device being mounted, via one or more mounting tabs, at a position on an asset to increase exposure to sunlight.

16. The method of claim 15,
where the solar charging information includes a time of day; and
where setting the radio operation state comprises:
setting the radio operation state based on the time of day.

17. The method of claim 15, further comprising:
setting a time value based on at least one of the energy storage information or the solar charging information; and
setting, after sending the location information, the timer based on the time value.

18. The method of claim 17, where setting the time value comprises:
decreasing the time value based on the present charge state of the energy storage component being greater than the charge threshold.

19. The method of claim 15, further comprising:
activating at least one radio prior to determining the location information; and
deactivating the at least one radio after sending the location information to the other device.

20. The method of claim 15, further comprising:
activating a location sensor before determining the location information;
receiving by the location sensor, after activating the location sensor and before determining the location information, a signal from a satellite navigation system; and
receiving, before activating the location sensor, ephemeris data for the satellite navigation system; and
where determining the location information comprises:
determining the location information based on the signal and the ephemeris data.

* * * * *